US009219585B2

(12) United States Patent
Kawasaki

(10) Patent No.: US 9,219,585 B2
(45) Date of Patent: Dec. 22, 2015

(54) RADIO BASE STATION APPARATUS, PILOT TRANSMISSION METHOD THEREOF, AND A TERMINAL APPARATUS

(75) Inventor: Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1769 days.

(21) Appl. No.: 12/425,614

(22) Filed: Apr. 17, 2009

(65) Prior Publication Data

US 2009/0203377 A1 Aug. 13, 2009

Related U.S. Application Data

(63) Continuation of application No. PCT/JP2006/321361, filed on Oct. 26, 2006.

(51) Int. Cl.
*H04L 5/00* (2006.01)
*H04W 52/02* (2009.01)

(52) U.S. Cl.
CPC .............. *H04L 5/005* (2013.01); *H04L 5/0089* (2013.01); *H04W 52/0206* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 5,867,478 | A | 2/1999 | Baum et al. | |
| 7,460,466 | B2 * | 12/2008 | Lee et al. | 370/208 |
| 2002/0159430 | A1 * | 10/2002 | Atarashi et al. | 370/347 |
| 2005/0163238 | A1 | 7/2005 | Fujii | |
| 2006/0039318 | A1 | 2/2006 | Oh et al. | |
| 2006/0171342 | A1 | 8/2006 | Dateki | |
| 2007/0254598 | A1 * | 11/2007 | Bachl et al. | 455/73 |
| 2008/0075060 | A1 * | 3/2008 | Tiirola et al. | 370/344 |
| 2008/0107158 | A1 | 5/2008 | Yoshii et al. | |
| 2009/0010213 | A1 * | 1/2009 | Yamada et al. | 370/329 |
| 2009/0203377 | A1 | 8/2009 | Kawasaki | |

FOREIGN PATENT DOCUMENTS

| | | |
|---|---|---|
| EP | 1 865 626 | 12/2007 |
| JP | 2001-044963 | 2/2001 |
| JP | 2003-348046 | 12/2003 |
| JP | 2005-005781 | 1/2005 |
| JP | 2006-211284 | 8/2006 |
| JP | 2006-287757 | 10/2006 |
| JP | 4985650 | 5/2012 |
| WO | 2006/049282 | 5/2006 |

(Continued)

OTHER PUBLICATIONS

International Search Report dated Jan. 10, 2007 for corresponding International Application No. PCT/JP2006/321361.

(Continued)

*Primary Examiner* — Kodzovi Acolatse
(74) *Attorney, Agent, or Firm* — Myers Wolin, LLC

(57) ABSTRACT

In conditions of low data traffic, such as during the night, when transmitting pilots in a downlink radio transmission zone, sub frames are divided into (1) first sub frames that transmit common pilots over a whole transmission band, and (2) second sub frames that transmit common pilots over a specified narrow band of a whole transmission band, where first sub frames are transmitted at a specified period, and second sub frames are transmitted for period of time except the specified period.

15 Claims, 16 Drawing Sheets

(56) References Cited

FOREIGN PATENT DOCUMENTS

| | | |
|---|---|---|
| WO | 2006/068023 | 6/2006 |
| WO | 2006/109492 | 10/2006 |

OTHER PUBLICATIONS

3GPP TR 25.814 V7.0.0 (Jun. 2006) Technical Report; 3rd Generation Partnership Project; Technical Specification Group Radio Access Network; Physical layer aspects for evolved Universal Terrestrial Radio Access (UTRA) (Release 7); Sophia Antipolis, Valbonne, France; Dated Jun. 2006.

Notification of Reasons for Refusal issued by the Japanese Patent Office for corresponding Japanese Patent Application No. 2008-540850, dispatch date Feb. 15, 2011, with attached English translation.

Notification of Reasons for Refusal issued for corresponding Japanese Patent Application No. 2011-185487, dispatched Apr. 23, 2013, with English translation.

The extended European search report includes the supplementary European search report and the European search opinion issued for corresponding European Patent Application No. 06822337.9, dated Mar. 6, 2013.

* cited by examiner

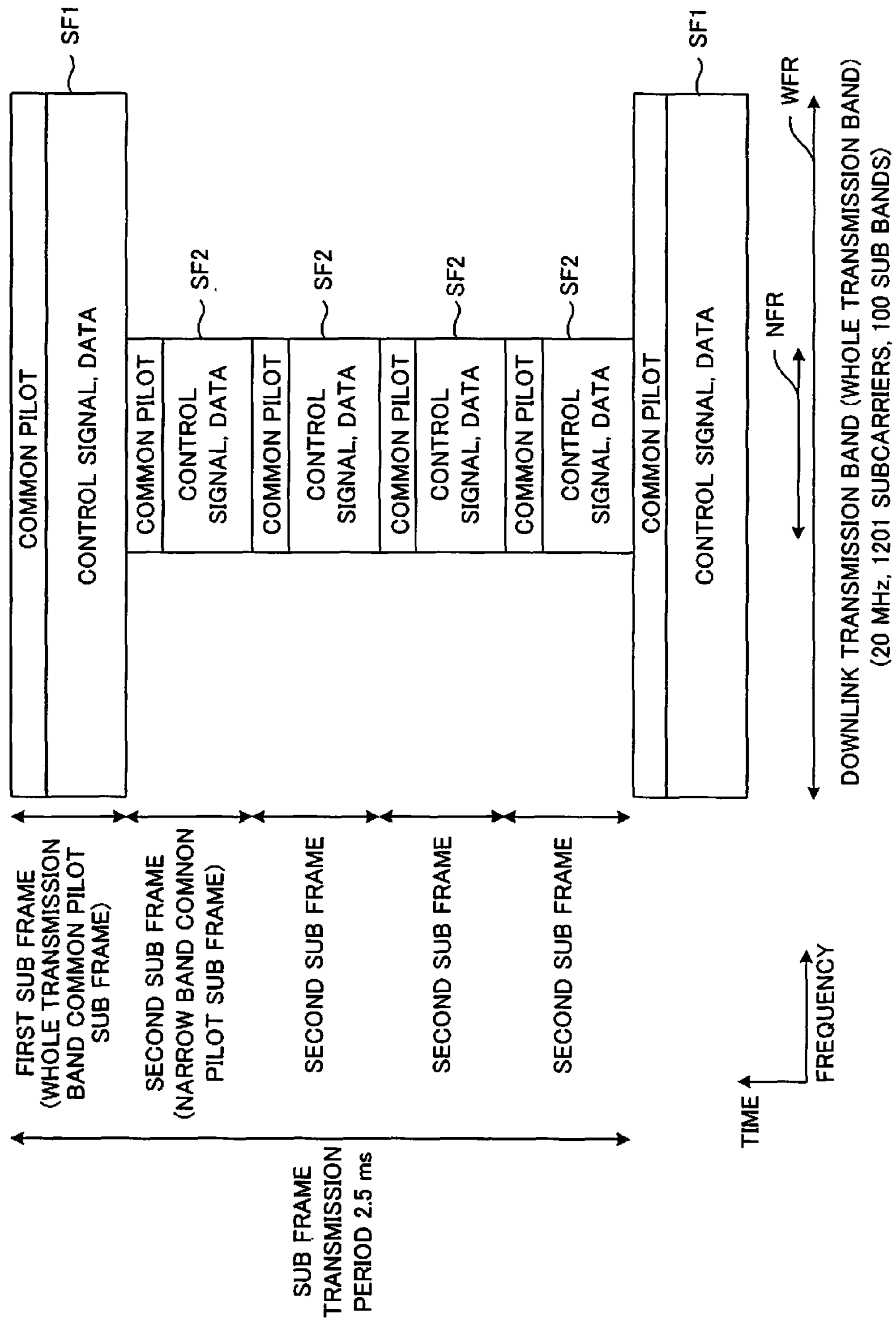
FIG. 1
COMMON PILOT
CONTROL SIGNAL, DATA
SF1
COMMON PILOT
CONTROL SIGNAL, DATA
SF2
COMMON PILOT
CONTROL SIGNAL, DATA
SF2
COMMON PILOT
CONTROL SIGNAL, DATA
SF2
COMMON PILOT
CONTROL SIGNAL, DATA
SF2
COMMON PILOT
CONTROL SIGNAL, DATA
SF1
NFR
WFR
DOWNLINK TRANSMISSION BAND (WHOLE TRANSMISSION BAND)
(20 MHz, 1201 SUBCARRIERS, 100 SUB BANDS)
FIRST SUB FRAME (WHOLE TRANSMISSION BAND COMMON PILOT SUB FRAME)
SECOND SUB FRAME (NARROW BAND COMNON PILOT SUB FRAME)
SECOND SUB FRAME
SECOND SUB FRAME
SECOND SUB FRAME
SUB FRAME TRANSMISSION PERIOD 2.5 ms
TIME
FREQUENCY

| TERMINAL ID NUMBER | TERMINAL CLASSIFICATION |
| --- | --- |
| | |
| ⋮ | ⋮ |

RADIO BASE STATION APPARATUS, PILOT TRANSMISSION METHOD THEREOF, AND A TERMINAL APPARATUS

CROSS-REFERENCE TO RELATED APPLICATIONS

This application is a continuation application of international PCT application No. PCT/JP2006/321361 filed on Oct. 26, 2006, now pending, the contents of which are herein wholly incorporated by reference.

BACKGROUND OF THE INVENTION

The present invention relates to a radio base station apparatus, pilot transmission thereof and a terminal apparatus, and more particularly to a radio base station apparatus that transmits sub frames that include pilots, the pilot transmission method thereof and a terminal apparatus in a downlink radio transmission zone.

Mobile communication systems, for example, cellular phone systems are developing from third generation to fourth generation systems. As this development takes place, new radio access technologies are implemented and the broader radio frequency band is needed, so it is predicted that the maximum data transmission capacity will greatly increase.

OFDM (Orthogonal Frequency Division Multiplex) is employed in the downlink of the radio access portion of EUTRAN (Evolved UTRAN), for which specifications are developed in 3GPP as a next generation cellular system (refer to 3GPP TR25. 814). FIG. 13 is a drawing abstractly explaining a sub frame sequence in the downlink of the radio access portion of EUTRAN, where five sub frames are shown with the horizontal axis being the frequency (downlink transmission band) and the vertical axis being time. As shown in FIG. 14, each sub frame (or slot) comprises 7 symbols (7 OFDM symbols) for example.

An OFDM signal that is transmitted in a 20 MHz wide radio transmission band comprises 1201 subcarriers. In addition, a 20 MHz wide transmission band is separated into 100 sub bands (or Resource Blocks), and when data is transmitted to a terminal, one or more consecutive or dispersed sub bands in the frequency axes are used. One sub band is presumed to comprise 12 subcarriers. The sub frame length is 0.5 ms, and common pilots are transmitted over all of the system transmission bands. The common downlink pilot signals are mainly used for coherent demodulation (channel estimation and compensation) of control signals and user data, and for measurement of the radio link quality. Common pilots are transmitted periodically for each sub frame.

The common pilot signal can be transmitted using all of the subcarriers of an OFDM symbol, however, in the radio access portion of a EUTRAN downlink, the common pilot signal is transmitted by one in every 6 subcarriers from one transmission antenna as shown in FIG. 14, and is transmitted in 2 OFDM symbols of the 7 OFDM symbols.

FIG. 15 is a diagram of transmitter in an OFDM communication system, where a data modulation unit 1 performs data modulation, for example, of transmission data (user data or control data), and converts the modulated data to a complex baseband signal (symbol) having an in-phase component and quadrature component. A time-division multiplexing unit 2 performs time-division multiplexing of the pilot symbols and data symbols. A serial-to-parallel conversion unit 3 converts input symbols to parallel data of M number of symbols, and outputs M number of subcarrier samples. An IFFT (Inverse Fast Fourier Transform) unit 4 performs IFFT (inverse Fourier transform) processing on subcarrier samples that are input in parallel and combines the results of the IFFT processing on the samples, then outputs the result of the combination as a discrete-time signal (OFDM signal). A guard interval insertion unit 5 inserts a guard interval in the OFDM signal that is input from the IFFT unit, and a transmission unit (TX) 6 performs DA conversion of the OFDM signal (called an OFDM symbol) in which a guard interval has been inserted, then converts the frequency of the OFDM signal from a baseband frequency to a radio band frequency, after which it performs high-frequency amplification and transmits the signal from an antenna 7.

FIG. 16 is a diagram of an OFDM receiving device. A signal that is output from the transmission antenna 7 shown in FIG. 15 passes through a fading channel (propagation path) of radio space and is received by a receiving antenna 8 of the receiving device, after which a receiving circuit (Rx) 9 converts the RF signal that is received by the antenna to a baseband signal, and an AD converter 10 converts that baseband signal to a digital signal and outputs the result. An AFC circuit 11 comprises: a first AFC circuit 11*a* that uses a pilot signal; a second AFC circuit 11*b* that uses a synchronization signal; and an AFC signal selection circuit 11*c*; where this AFC circuit 11 estimates the carrier frequency deviation between the terminal and base station, and adjusts the oscillation frequency of the local oscillator inside the receiving circuit.

A symbol extraction unit 12 detects the start of the OFDM symbols; and together with deleting the guard intervals GI, extracts the OFDM symbols and inputs them to a FFT unit 13. The FFT unit 13 performs FFT processing on each extracted OFDM symbol, and converts them to frequency domain subcarrier samples $S_0$ to $S_{M-1}$. A pilot extraction unit 14 extracts the pilot symbols from the FFT output, and a channel-estimation circuit 15 performs channel estimation for each subcarrier by calculating the correlation between the pilot symbols received at fixed intervals and a known pilot pattern, after which a channel-compensation circuit (synchronization detection unit) 16 uses the channel estimation value to compensate for channel fluctuation of the data symbols. Through the processing described above, transmission data that is distributed to each subcarrier is demodulated. It is not shown in the figure, however, after the demodulated subcarrier signal has been converted to serial data, the signal is decoded. An optimum sub-band setting unit 17 uses the received pilots to measure the reception state of each sub band (radio link quality, for example, SIR), and decides the most suitable sub band. The example of signal processing by the transmission device and reception device shown in FIGS. 15 and 16 is a simplified example, and in actual devices, more complicated processing is performed in order to improve characteristics.

FIG. 17 is a drawing explaining the first AFC circuit 11*a* that uses a pilot symbol, where an IFFT unit 11*a*-1 performs IFFT processing of a replica (known pilot) of the pilot signal that is transmitted from the transmission station, and generates a pilot signal that is continuous over time, a correlation calculation unit 11*a*-2 calculates the correlation between that pilot signal and the received signal, a peak detection unit 11*a*-3 detect the peak correlation value, and a phase detection unit 11*a*-4 uses the real portion R and the imaginary portion I of the peak correlation value to calculate the phase difference θ from the following equation.

$$\theta=\tan^{-1}(I/R)$$

This value θ occurs due to the frequency deviation, so it controls the oscillation frequency of the local oscillator based on the phase difference. The AFC circuit shown in FIG. 17 is an example.

FIG. 18 is a drawing explaining a synchronization signal, (A) is an example where a synchronization channel SCH (synchronization signal) is repeatedly transmitted two times, and (B) is an example where a synchronization channel SCH (synchronization signal) is repeated at the start of a frame and transmitted.

FIG. 19 is a drawing explaining the second AFC circuit 11*b*, where a delay unit 11*b*-1 delays the input signal one symbol or one frame, a correlation calculation unit 11*b*-2 calculates the correlation of the repeated portion, a peak detection unit 11*b*-3 detects the peak correlation value, and a phase detection unit 11*b*-4 uses that peak correlation value to calculate the phase difference θ in the same way as in the case shown in FIG. 17, and based on this phase difference, controls the oscillation frequency of the local oscillator. For example, rough correction of the frequency offset is performed using the synchronization signal, and after that fine correction is performed using the pilot signal.

In addition to being used for adjusting the frequency offset as described above, the synchronization signal is also used for detecting the symbol timing, the frame timing, pilot signal pattern, and the like. [0006]

During the period of one day, the amount of data transmission that includes audio data, or in other words, the data traffic, fluctuates. Especially, late at night, the data traffic becomes very low. It is predicted that, during one day, the ratio of the traffic between when the data traffic is at a peak and when the traffic is low, such as during the night, will become larger as the maximum data transmission capacity increases with the change from a third-generation to fourth-generation system.

When data traffic is low such as during the night, the amount of data transmitted becomes low, or in other words, the amount of radio communication resources that is necessary becomes low, and a condition occurs in which the whole transmission band is not fully used. This condition becomes more notable the broader the transmission bandwidth becomes. In a condition in which the data traffic is low, the number of sub bands that are not used for data transmission increases, so there is no need to transmit control signals and data using unused sub bands, as well as there is no need to transmit pilot signals for the purpose of demodulating those control signals and data using those sub bands.

Moreover, in a condition of low data traffic, it is inefficient to transmit the pilots constantly for measuring the quality of the radio link using all of the sub bands. That is because, only a part of the sub bands are used for data transmission.

From the aspect described above, in a condition of low data traffic, it is inefficient to transmit downlink common pilot signals having large power for each sub frame over the whole transmission band (broad transmission band). That is, in a condition of low data traffic, transmitting common pilots using all of the sub bands for each sub frame is inefficient from the aspect of the power consumption required for transmitting the pilots.

SUMMARY OF THE INVENTION

Taking the aforementioned into consideration, it is the object of the present invention to reduce power consumption that is required for pilot transmission in conditions such as low data traffic.

Another object of the present invention is to control the period of transmitting common pilots over the whole transmission band (broad transmission band) based on the total number of terminals that are in communication with a base station (terminals in the active mode and terminals in the DRX/DTX mode).

Another object of the present invention is, in a case where common pilots are not transmitted over the whole transmission band to control the bandwidth of a transmission band (narrow band) based on the number of terminals that are always in a state capable of data transmission with a base station (terminals in the active mode).

Another object of the present invention is to assign sub bands that belong to the narrow band as sub bands for individual data transmission to a terminal when that terminal is moving at high speed.

Another object of the present invention is to transmit an individual pilot together with individual data using a sub band during transmission of a sub frame over a narrow band when transmitting that individual data using a sub band that does not belong to the narrow band.

The present invention is a pilot transmission method in a downlink radio transmission zone and comprises: a step of dividing sub frames into first sub frames that transmit common pilots over a whole transmission band (broad transmission band), and second sub frames that transmit common pilots over a specified narrow band (band that is narrower than a broad transmission band) of a whole transmission band; and a step of transmitting common pilots by transmitting the first and second sub frames in a downlink radio transmission zone. In this case, the method transmits the first sub frames at a certain period T, and transmits the second sub frames at time section when said first sub frame is not transmitted. By doing so, it is possible to not transmit common pilots over a whole band when in a state of low data traffic, and thus it is possible to reduce the power consumption required for pilot transmission. Moreover, a base station always transmits common pilots over a specified narrow band portion, so it is possible to receive the pilots and perform frequency offset control even in the case where the terminal performs intermittent data transmission with a base station.

The pilot transmission method of the present invention further comprises: a step of monitoring the sum of the number of terminals that are always in a state capable of data transmission/data reception with a base station, and the number of terminals that are in a state capable of intermittent data transmission/data reception with a base station; and a step of controlling the period T of the first sub frames based on that sum number, or keeping the period constant and controlling the number of continuous first sub frames based on that sum number. By doing so, common pilots can be transmitted over the whole band in a state of high data traffic such as during the day, and, for example, in a state of low data traffic such as during the night, common pilots can be transmitted intermittently without always being transmitted over the whole band, so it is possible to reduce the power consumption that is required for pilot transmission.

The pilot transmission method of the present invention further comprises: a step of monitoring the number of terminals that are always in a state capable of data transmission with a base station (active mode terminals), and a step of controlling the bandwidth of the narrow band based on that number of terminals. By doing so, it is possible for all desiring terminals to perform communication.

The pilot transmission method of the present invention further comprises: a step of dividing a whole band (broad band) into a plurality of sub bands (or Resource Blocks); and when data is transmitted to a specified terminal using one or more sub bands, if the terminal is a terminal moving at high speed, a step of assigning bands belonging to the narrow band for that high-speed moving terminal at the time of transmission of the first and second sub frames. By doing so, it is possible to improve reception quality by averaging channel-estimation values that are found from received values of common pilots of previous and following sub frames when moving at high speed.

The pilot transmission method of the present invention further transmits an individual pilot with individual data using a sub band that does not belong to the narrow band when transmitting data by that sub band during transmission of a second sub frame. By doing so, pilot processing using an individual pilot is possible even when a common pilot cannot be utilized.

The pilot transmission method of the present invention, transmits pilot signals using a first frequency band in a first period, and in a second period, transmits pilot signals using a second frequency band that is a more narrow frequency band than the first frequency band.

In this way, by using a first frequency band that is a broad frequency band, and a second frequency band that is a narrow frequency band, it is possible to mix both periods for transmitting pilot signals, and thus the invention can be applied to the reduction of power used in transmitting pilot signals.

BRIEF DESCRIPTION OF THE DRAWINGS

FIG. 1 is a drawing explaining the common pilot transmission method of the present invention.

DESCRIPTION OF THE PREFERRED EMBODIMENTS (A) Overview of the Invention

FIG. 1 is a drawing explaining a common pilot transmission method of the present invention. In this embodiment, at a first period (starting section of the first sub frame SF1 in FIG. 1), a pilot signal is transmitted using a first frequency band, and at a second period (starting section of the second section sub frame SF2 in FIG. 1), a pilot signal is transmitted using a second frequency band that is narrower than the first frequency band.

A downlink radio transmission band has a bandwidth of 20 MHz, and an OFDM signal that is transmitted over this radio transmission band comprises 1201 subcarriers. A radio transmission band having a bandwidth of 20 MHz is separated into 100 sub bands (or Resource Blocks), and when transmitting data to a terminal, one or more sub bands which are continuous or non-continuous over frequency axes are used. One sub band comprises 12 subcarriers. The length of a sub frame (or slot) is 0.5 ms, and, for example, the sub frame comprises 7 OFDM symbols and is used for transmitting common pilots, control signals and user data.

In the present invention, sub frames are divided into: (1) first sub frames (whole band sub frames) SF1 that transmit common pilots over the whole transmission band WFR; and (2) second sub frames (narrow band sub frames) SF2 that transmit common pilots over a specified narrow band NFR of the whole transmission band; where in a downlink radio transmission zone, these first and second sub frames SF1, SF2 are transmitted. In FIG. 1, one of the five sub frames is periodically transmitted as a first sub frame SF1, and four of the remaining sub frames are taken to be second sub frames SF2. In other words, the first sub frame SF1 is transmitted at a certain period (2.5 ms in the figure), and the second sub frames SF2 are transmitted at time section when the first sub frame is not transmitted.

The transmission period T of the first sub frame SF1 could also be 5 ms, 10 ms, and so on. During the daytime, the number of terminals that are communicating within a cell increases, so the period is set at T=0.5 ms, and at night, the number of terminals that are communicating within a cell decreases, so the period is set at T=2.5 ms. That is it is possible to control the change of the transmission period T of the first sub frame SF1 according to the number of terminals that are communicating within a cell, where that the period T can be controlled according to the number of terminals as 0.5 ms, 1.0 ms, 1.5 ms, 2.0 ms, 2.5 ms, 3.0 ms, and so on.

Figure 2:
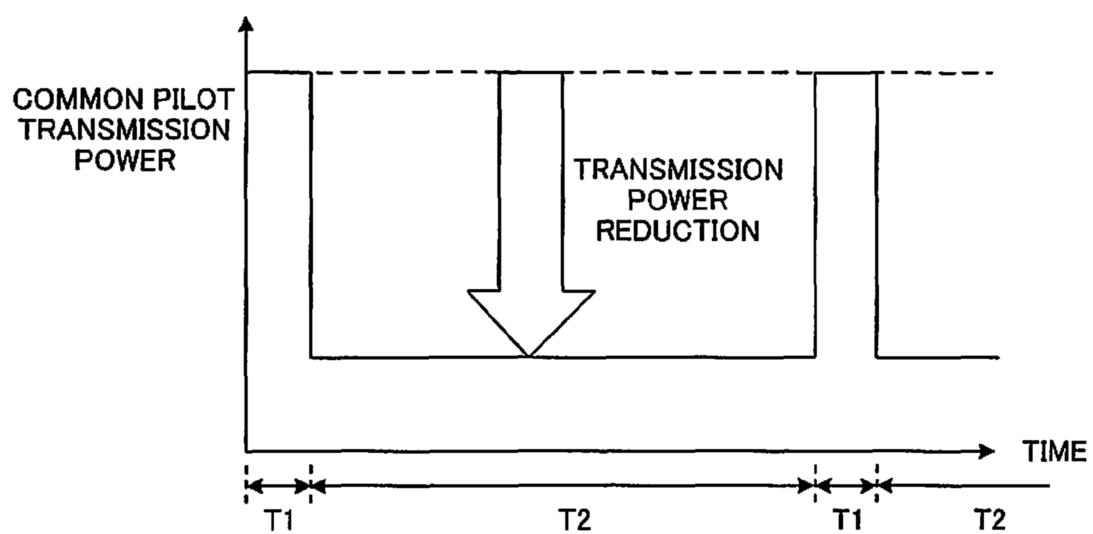
FIG. 2 is a drawing explaining common pilot transmission power when a first and second sub frame are mixed and transmitted.

FIG. 2 is a drawing explaining the common pilot transmission power when the first and second sub frames are mixed and transmitted, where when transmitting the first sub frame (T1), the transmission power for the transmitting the common pilot increases, however, when transmitting the second sub frames (T2), the transmission power decreases, so the total transmission power decreases.

As a result, in conditions in which there is low data traffic (for example, during the night), it is possible to reduce the power consumption required for transmitting pilots by not transmitting common pilots using the whole transmission band (broad transmission band). Moreover, the base station is constantly transmitting common pilots, so even in the case where a terminal intermittently performs data transmission with a base station, it is possible for the terminal to receive the pilot and perform frequency offset control.

(B) Sub Frame Transmission Method

Figure 3:
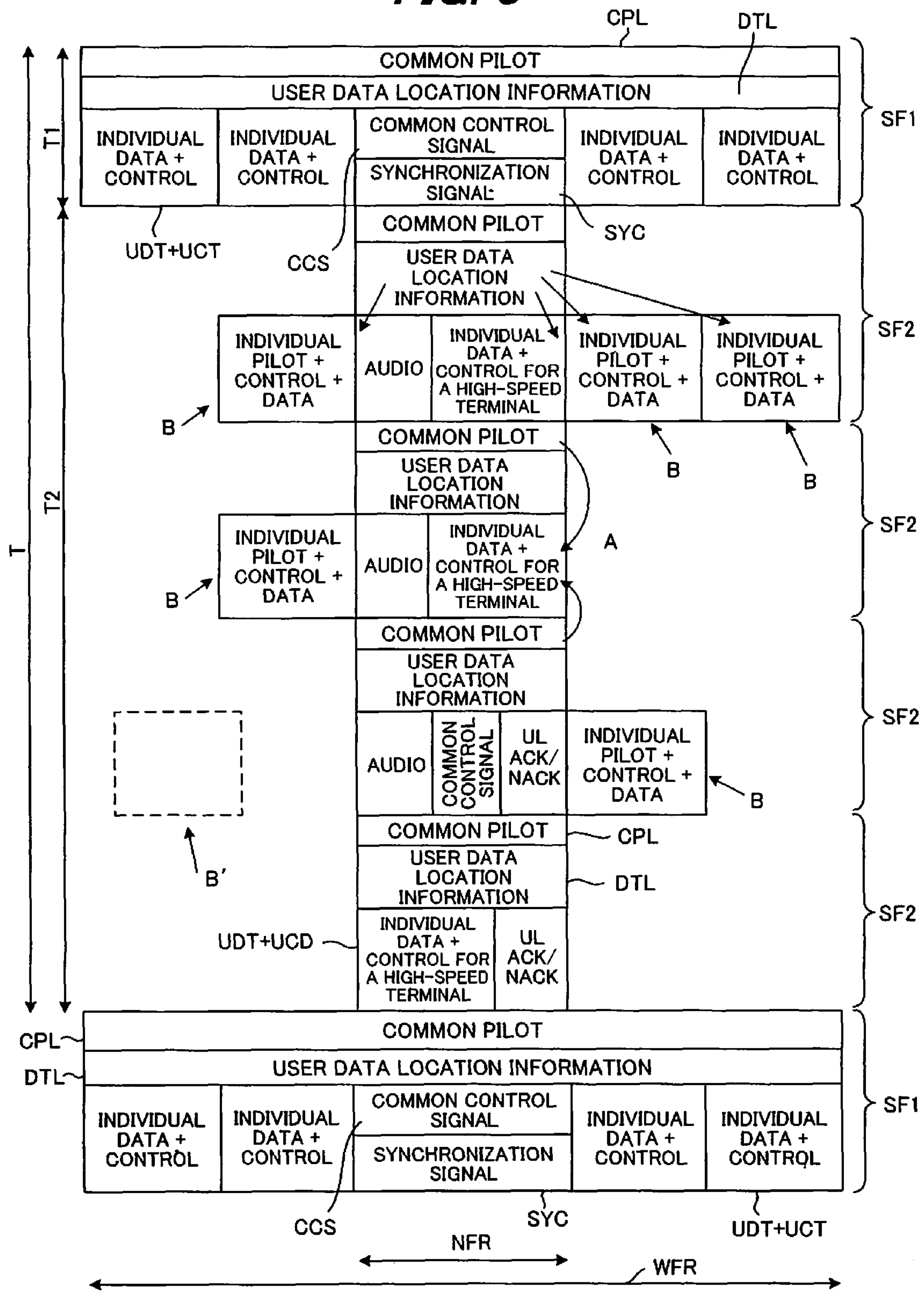
FIG. 3 is a drawing explaining the sub frame transmission method of the present invention.

FIG. 3 is a drawing explaining a sub frame transmission method, where the same reference numbers are used for parts that are the same as those shown in FIG. 1.

A first sub frame (whole band sub frame) SF1, in which a common pilot is transmitted over the whole transmission band WFR, includes a common pilot CPL, user data location information DTL, common control signal CCS, synchronization signal SYC, individual data for each user UDT, and individual control data UCT. The common pilot CPL is used for SIR measurement and synchronous demodulation on the receiving side, and is transmitted over the whole transmission band WFR. User data location information DTL is information that notifies the terminal of the sub band by which the user data will be transmitted, where a terminal makes reference to this location information DTL, checks whether there is data for itself, and when there is data, retrieves the individual data UDT and individual control data UCT from a specified sub band. The common control signal CCS is a control signal that is common for all terminals, and notifies of information that specifies the transmission period of the first sub frame SF1, or specifies the narrow band NFR of the second sub frames SF2, and the synchronization signal SYC is a signal that is used for adjusting the frequency offset between the terminal and base station, as well as detecting the symbol timing, frame timing, pilot signal pattern, and the like.

The second sub frame (narrow band sub frame) SF2, in which a common pilot is transmitted over a narrow band NFR, includes a common pilot CPL, user data location information DTL, and individual data UDT and individual control data UCT for each user, and also includes as appropriate, an audio signal, ACK/NACK signal, and common control signal.

Based on the transmission period and narrow band information that is included in the common control signal CCS, the terminal switches the receiving band and performs receiving control for the first and second sub frames.

The first sub frames (whole band sub frame) SF1 are transmitted at a ratio of one time per 5 sub frames, and at other time section T2, the second sub frames (narrow sub frames) SF2 are transmitted. The location of the narrow band NFR does not need be in the center of the whole band WFR (in the figure it is shown in the center), but could also be located toward the end of the whole band WFR. Moreover, the narrow band could also be divided into a plurality of narrow bands with the total band being narrower than the whole band.

The ratio of first sub frames to the total sub frames, or the period T of the first sub frame is variable, however, when changing the ratio or period, it is preferred that the base station uses a common control signal beforehand to notify all of the terminals of new ratio or period. For example, when the base station changes the transmission period T of the first sub frame SF1 according to the number of total terminals that are communicating within a cell, the base station uses a common control signal CCS to notify all of the terminals of the new period beforehand. In this case, the intermittent receiving/transmitting period of a terminal (terminal in the DRX/DTX mode) that performs intermittent data transmission/data reception with the base station is controlled so that it matches the transmission period T of the first sub frame.

Furthermore, the bandwidth of the narrow band NFR is variable, however, it cannot be changed within the time section T2. Therefore, in FIG. 3 the bandwidths of the narrow bands for the 4 consecutive second sub frames SF2 that follow after the first sub frame SF1 are the same. However, it is possible to make the narrow band of the second sub frames SF2 that follow the next first sub frame SF1 different from the narrow band up to that point. However, it is preferred that the base station uses a common control signal CCS beforehand to notify all of the terminals of which bandwidth will be set. For example, when the base station changes the bandwidth of the narrow band according to the number of terminals that are communicating within a cell, the base station uses a common control signal CCS to notify all of the terminals of the new bandwidth of the narrow band beforehand.

The base station transmits the common control signal CCS and synchronization signal SYC of the first sub frame SF1 in a band that is the same as the narrow band NFR of the second sub frames SF2. In FIG. 3, the synchronization signal is transmitted only in the first sub frame SF1, however, it is also possible to transmit the synchronization signal in a second sub frame SF2 as well. By doing so, it becomes possible to perform frequency offset control using the synchronization signal, as well as detection of the symbol timing, frame timing, and pilot signal pattern in the sub frame period.

The base station transmits data for a high-speed mobile terminal using a sub band of a narrow band NFR for all sub frames. In the case of a high-speed mobile terminal, fluctuation in the radio channel becomes intense, so in this way, as shown in A of the figure, when demodulating the data, by averaging the common pilots of the previous and following sub frames, it is possible to improve the accuracy of channel estimation and improve the data demodulation characteristics.

During transmission of the second sub frames, when there is a large amount of data to be transmitted, the base station transmits data (individual data, individual control data) using sub bands other than the narrow band NFR, as shown in B of the figure, as well as transmits an individual pilot using the same sub bands. In this way, when a terminal receives individual data, it is possible to perform synchronous demodulation and SIR measurement using the individual pilot instead of using the common pilot. In FIG. 3, the bands B that are used other than the narrow band NFR are bands that are adjacent to the narrow band NFR, however, as shown by the dashed line B', the bands can also be separated from the narrow band NFR.

The first sub frame SF1 does not always have to be limited to the format shown in FIG. 3, and it is also possible to transmit the common control signal or synchronization signal over the whole band.

(B) Terminal Classification

In the present invention, it is necessary to identify whether a terminal that is communicating is a terminal in the active mode, or a terminal in the DRX/DTX mode (intermittent receiving/intermittent transmitting terminal). Therefore, first an active mode terminal, DRX/DTX mode terminal and idle mode terminal will be defined.

Active Mode Terminal

An active mode terminal is a communicating terminal that is always in a state capable of receiving data. In every subframe, the active mode terminal receives a common control signal for determining whether or not there is data that has been sent to that terminal. When there is a transmission instruction from a base station, the terminal is immediately in a state capable of transmitting data in the Uplink UL. The network knows which cell the active mode terminal is in. An active mode terminal maintains synchronization in the radio transmission zone for both downlink and Uplink transmission, and is always in a state capable of data transmission with a base station.

DRX/DTX Mode Terminal

A DRX/DTX mode terminal is a communicating terminal that is in a state capable of intermittent data transmission with a base station. When a base station has data to transmit to a DRX/DTX mode terminal, the base station notifies the terminal of the fact using a control signal at predetermined cycle timing. The DRX/DTX mode terminal receives and decodes the control signal at the predetermined cycle, and determines whether there is data to be transmitted to that terminal. When the DRX/DTX mode terminal transmits control information to the base station, it transmits that information at the predetermined cycle timing.

When necessary, for example, when there is an instruction from the base station, or when transmitting data in the Uplink, the DRX/DTX mode terminal transmits a necessary control signal (for example, a random active signal) to the base station in order to change to the active mode. The network knows which cell this DRX/DTX mode terminal is in. A DRX/DTX mode terminal basically has synchronization in the radio zone for downlink transmission, however, the terminal may request a timing offset correction signal from a base station in order to correct synchronization in Uplink transmission.

Idle Mode Terminal

An idle mode terminal is a terminal that is not communicating with a base station. When a base station has data to transmit to an idle mode terminal, the base station transmits a paging signal at predetermined cycle timing, and with that paging signal, notifies (calls) the idle mode terminal that there is data to transmit. When the idle mode terminal knows that there is data for that terminal, the terminal sends a random access signal to the base station in order to change to the active mode. Since a paging signal must be sent to the idle mode, the network knows which cell group the idle mode terminal is in.

(C) Construction of a Base Station

Figure 4:
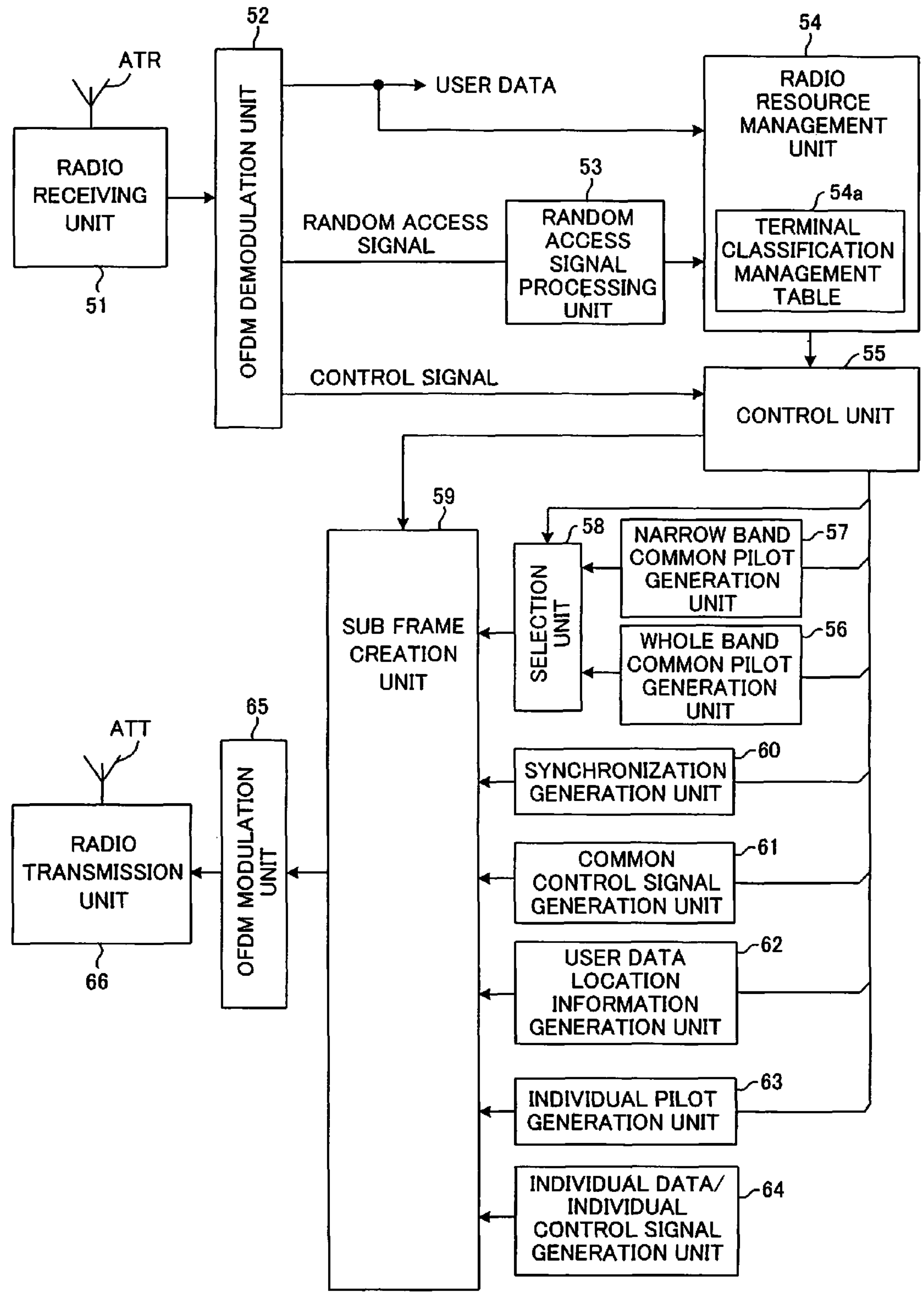
FIG. 4 is a schematic drawing of an example of a base station.

FIG. 4 is a drawing showing the construction of a base station. A radio receiving unit 51 performs DOWN conversion of the frequency of a radio signal that was received by an antenna ATR to a baseband signal, then performs AD conversion and inputs the result to an OFDM demodulation unit 52. The OFDM demodulation unit 52 separates the user data and control data that were sent from each user, and the random access signals that were sent from idle terminals or DRX/DXT mode terminals, then outputs the result. A random access signal processing unit 53 performs a known random access processing when a random access signal is received from an idle terminal or a DRX/DTX mode terminal, and inputs the ID number for that terminal to a radio resource management unit 54.

Figures 5, 6:
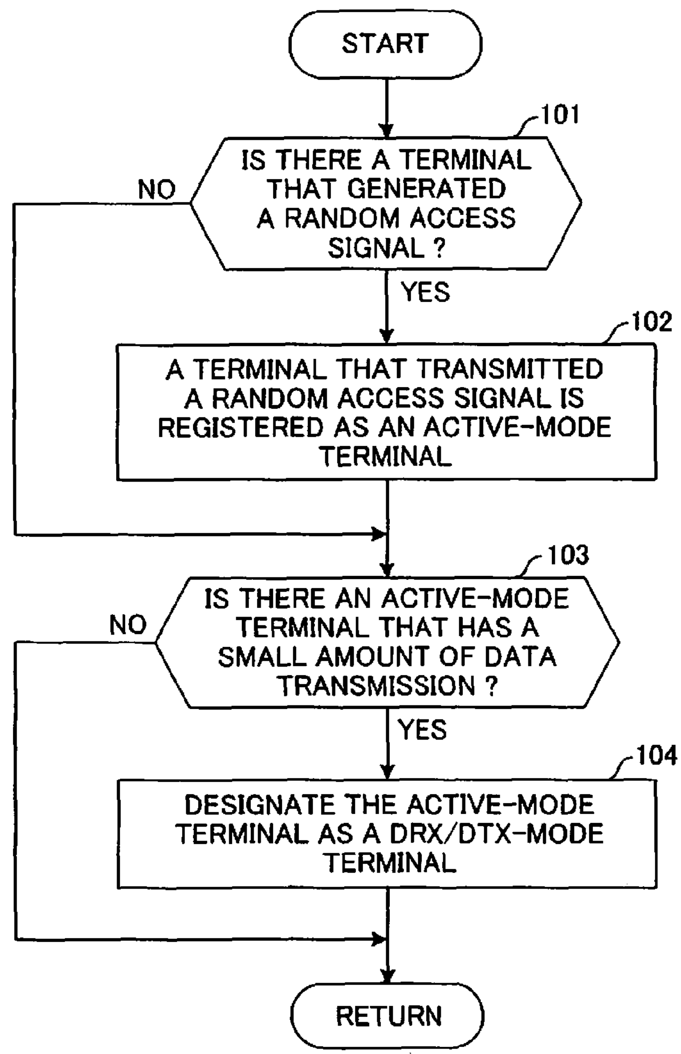
FIG. 5 is schematic drawing of an example of a terminal classification management table.
FIG. 6 is a flowchart of the terminal classification management process by the radio resource management unit.

The radio resource management unit 54 comprises a terminal classification management table 54*a*, and manages whether a communicating terminal is an active mode terminal that is in a state capable of data transmission with a base station, or is a DRX/DTX terminal that is in a state capable of intermittent data transmission with a base station. When a random access signal is received from an idle terminal and a DRX/DTX terminal, the radio resource management unit 54 registers these terminals as active mode terminals in the terminal classification management table 54*a*, as well as monitors the amount of data communication per a specified amount of time of each active mode terminal, and when the amount of data communication is a set value or less, changes that active terminal to a DRX/DTX terminal, and deletes terminals that have ended communication from the terminal classification management table 54*a*. FIG. 5 shows an example of the construction of the terminal classification management table 54*a*, where the types of terminals that correspond to the ID numbers of communicating terminals are recorded.

A control unit 55 performs: (1) control to decide the period T of the first sub frame and the band width of the narrow band NFR; (2) control to decide the sub band used to transmit the individual data/individual control signals for each terminal; (3) transmission control for individual pilots during the transmission of second sub frames; (4) control to assign sub bands for individual data of terminals moving at high speed; etc.

A whole band common pilot generation unit 56 generates and outputs common pilot signals for the whole band at timing that is specified by the control unit 55, a narrow band common pilot generation unit 57 generates and outputs common pilot signals for the narrow band specified by the control unit 55 at specified timing, and a selection unit 58 selectively inputs common pilot signals for the whole band and common pilot signals for the narrow band at timing specified by the control unit 55 to a sub frame generation unit (physical channel generation unit) 59. Moreover, a synchronization signal generation unit 60, common control signal-generation unit 61, user data location information-generation unit 62 and individual pilot generation unit 63 generate specified signals according to instructions from the control unit 55 and input those signals to the sub frame generation unit 59. In other words, the synchronization signal generation unit 60 generates a synchronization signal SYC having a bandwidth that is specified by the control unit 55, the user data location information generation unit 62 generates user data location information DTL that specifies the sub bands that transmit the user data, and the individual pilot generation unit 63 generates individual pilots, where each unit inputs the respective signals to the sub frame generation unit 59. An individual data/individual control signal generation unit 64 generates data and control signals to be individually transmitted to the user terminals, and inputs those to the sub frame-generation unit 59.

Based on the transmission period T for a first sub frame that is known from the control unit 55, band information about the narrow band NFR, and information about the sub bands that transmit individual data and individual control signal, the sub frame generation unit 59 generates and outputs a first sub frame SF1 that includes the information shown in FIG. 3 during transmission of a first sub frame. Moreover, the sub frame generation unit 59 similarly generates a second sub frame SF2 that includes the information shown in FIG. 3 during transmission of a second sub frame.

An OFDM modulation unit 65 performs OFDM modulation of the first and second sub frames that are input from the sub frame generation unit 59, and a radio transmission unit 66 transmits the OFDM signal by radio transmission from a transmission antenna ATT.

In FIG. 4 an example is shown in which an OFDM signal is used in the Uplink, however it is not absolutely necessary to use an OFDM signal in the Uplink.

(D) Base Station Control (a) Terminal Classification Management

FIG. 6 is a flowchart for the terminal classification management process by the radio resource management unit 54.

The radio-resource management unit 54 checks whether there is a terminal that has transmitted a random access signal based on a signal from the random access signal processing unit 53 (step 101), and when there is such a terminal, registers the terminal (idle mode terminal) that generated that random access signal in the terminal classification table 54*a* as an active mode terminal (step 102). When the terminal that generated the random access signal is a DRX/DTX mode terminal, the radio resource management unit 54 changes that terminal from a DRX/DTX mode terminal to an active mode terminal.

Next, the radio resource management unit 54 checks whether there is a terminal among the active mode terminals that has a small amount of data transmission (step 103), and when there is such a terminal, changes that active mode terminal to a DRX/DTX mode terminal (step 104), then repeats the above process.

The control unit 55 notifies a terminal whose terminal classification was changed from a DRX/DTX mode terminal to an active mode terminal, and a terminal that has been changed from an active mode terminal to a DRX/DTR mode terminal, of the change in classification by using an individual control signal.

(b) Control for Changing the Transmission Period of a First Sub Frame

Figure 7:
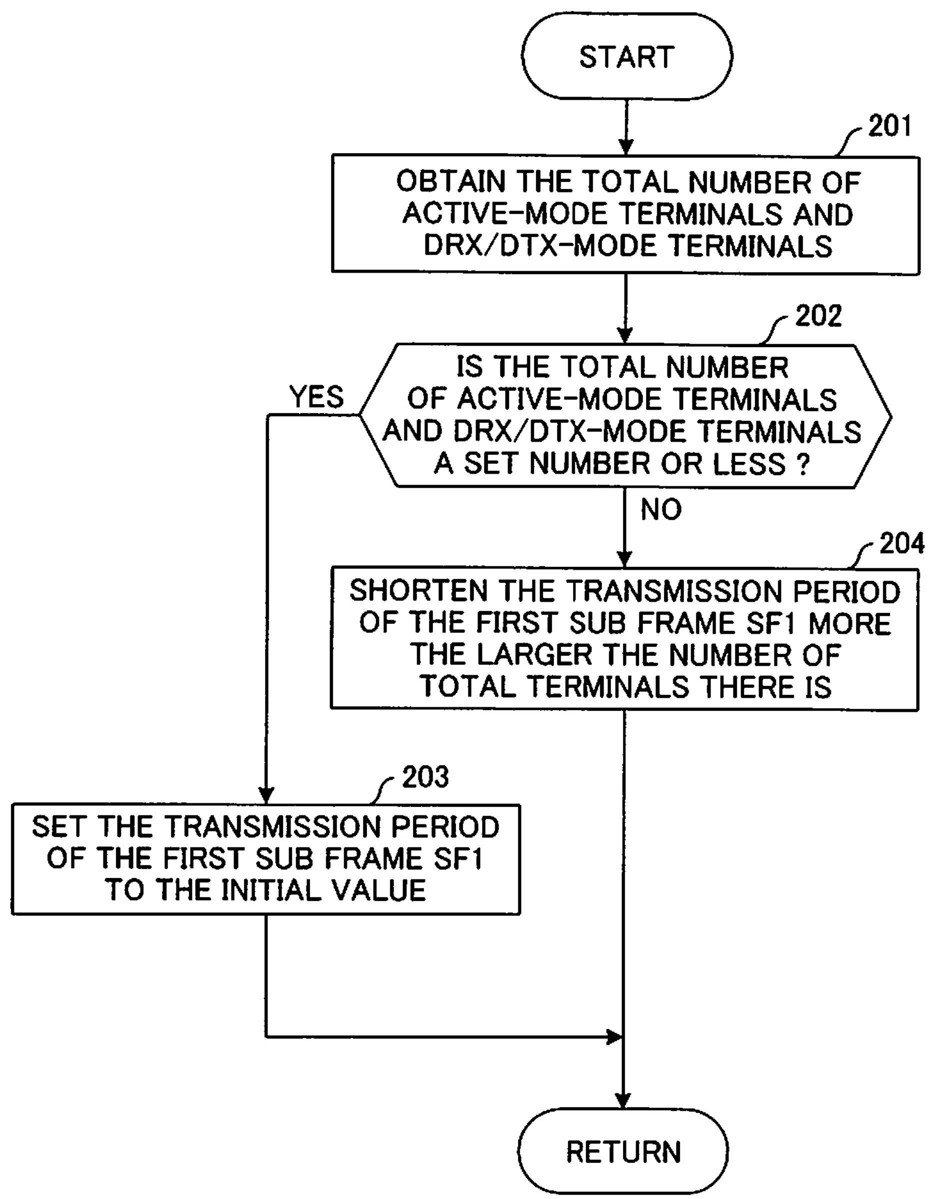
FIG. 7 is a flowchart of the transmission period change control process for the first sub frame.

FIG. 7 shows a flowchart of the control process for changing the transmission period of a first sub frame.

The control unit 55 makes referenced to the terminal classification management table 54*a* of the radio resource management unit 54, and obtains the total number of active mode terminals and DRX/DTX mode terminals, or in other words, the total number of communicating terminals (step 201), then checks whether that total number is a set number or less (step 202), and when the number is a set number or less, sets the transmission period T of a first sub frame SF1 to the initial value of 5 ms for example (step 203). On the other hand, when the total number is greater than a set number, the control unit 55 shortens the transmission period T of a first sub frame more the larger the total number is (step 204). It is possible to store a correspondence table for the total number and period T in advance, and decide the period T based on that correspondence table.

In that case, control is performed so that the intermittent receiving period at which a DRX/DTR mode terminal performs intermittent data transmission with a base station is the same as the transmission period T for a first sub frame.

In the explanation above, the period of a first sub frame was controlled based on the total number of communicating terminals, however, it is also possible to fix the period and control the number of continuous first sub frames.

(c) Controlling the Bandwidth of the Narrow Band

Figure 8:
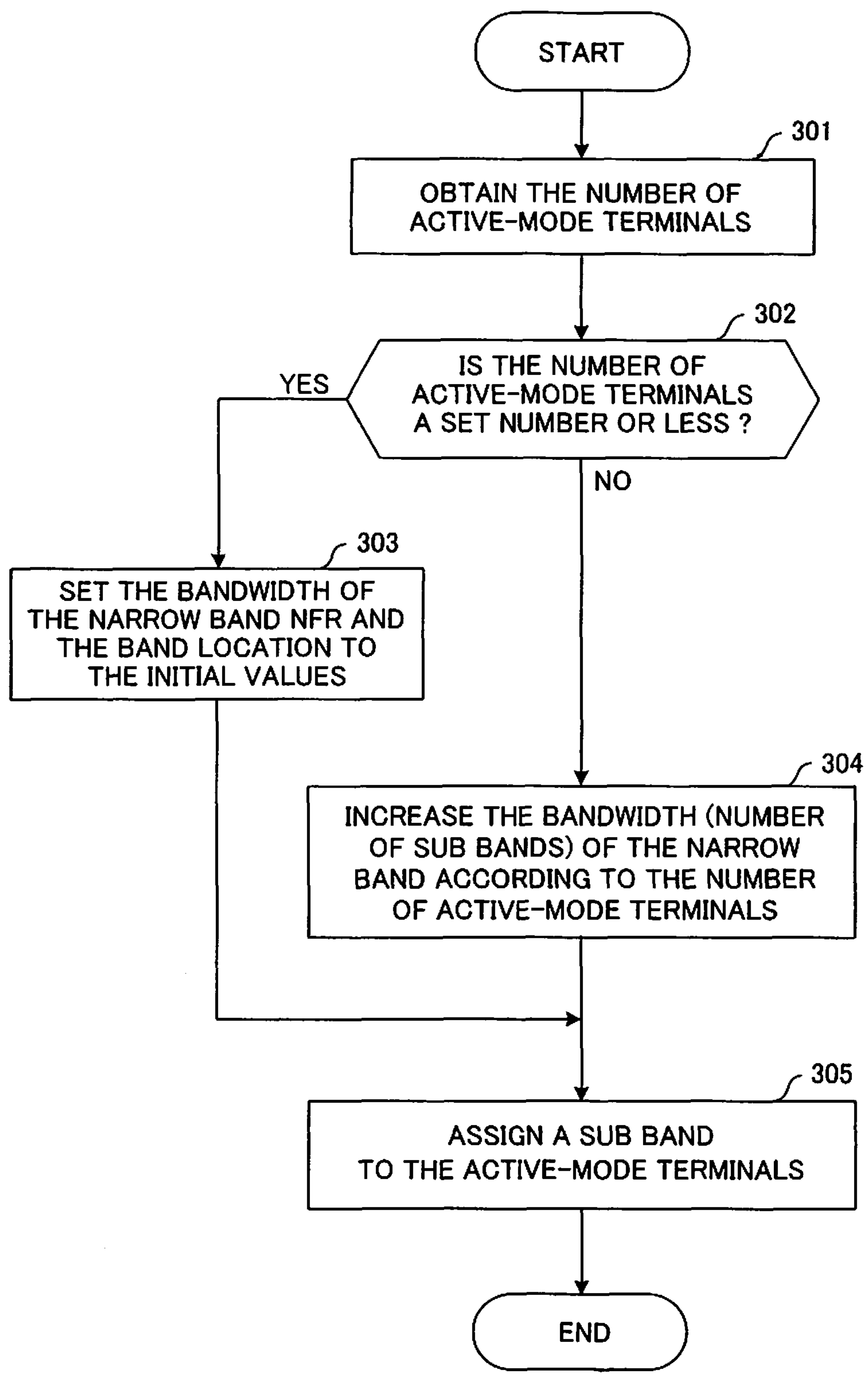
FIG. 8 is a flowchart of the bandwidth control process for a narrow band NFR, which is the transmission band for the second sub frame.

FIG. 8 is a flowchart of the process for controlling the bandwidth of the narrow band NFR, which is the transmission band for second sub frames.

The control unit 55 makes reference to the terminal classification management table 54*a* of the radio resource management unit 54 to obtain the number of active mode terminals (step 301) and check whether the number of terminals is a set number or less (step 302), and when the number of terminals is a set number or less, sets the bandwidth and band location of the narrow band NFR to the initial values (step 303). On the other hand, when the number of active mode terminals is greater than a set number, the control unit 55 increases the bandwidth of the narrow band NFR more the greater the number of active mode terminals is (step 304). It is possible to store a correspondence table of the number of active mode terminals, bandwidth and band location, and to decide the bandwidth and band location based on that correspondence table.

After that, when a second sub frame SF2 is transmitted, the control unit 55 assigns the decided sub band of the narrow band NFR to an active mode terminal.

(d) Individual Pilot Transmission Control

In the second sub frame transmission section T2 (see FIG. 3), the amount of data transmission from the active mode terminals may increase and the bandwidth of the narrow band NFR may not be sufficient. In that case, it is necessary to transmit individual data and individual pilots by sub bands other than the sub bands of the narrow band NFR.

Figure 9:
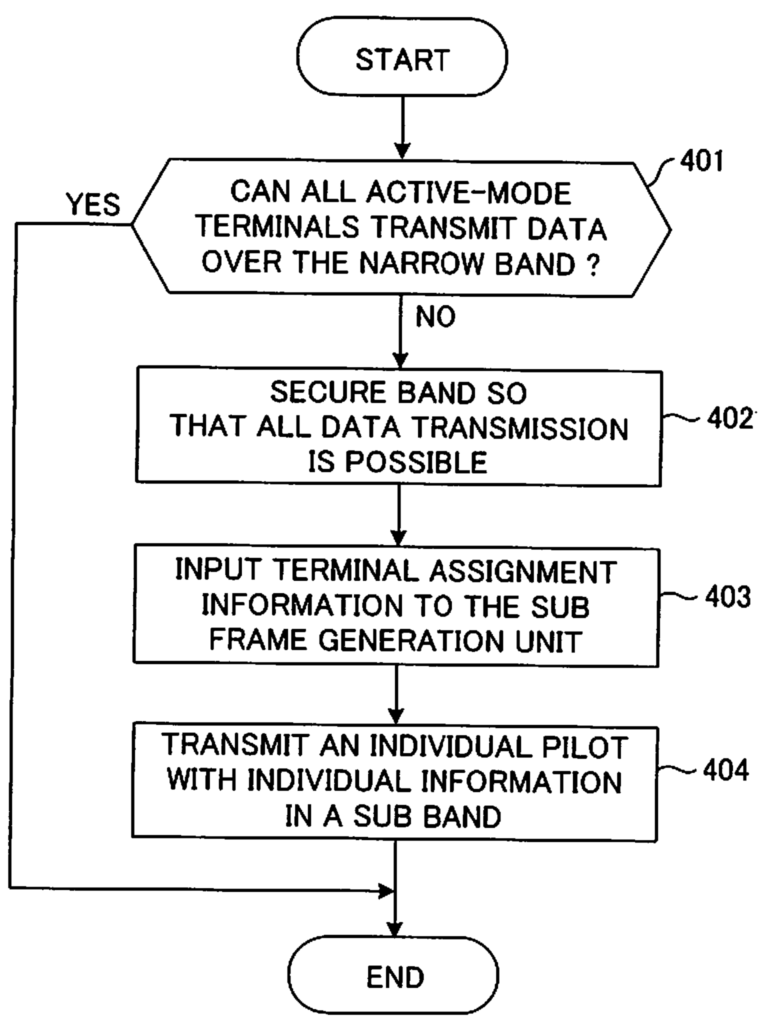
FIG. 9 is a flowchart for the individual pilot transmission control process.

FIG. 9 is a flowchart for controlling the transmission of individual data and individual pilots. The control unit 55 monitors whether it is possible to transmit the data of all active mode terminals using the bandwidth of the narrow band NFR (step 401), and when it is not possible, secures a specified band adjacent to the narrow band so that all of the data can be transmitted (see B of FIG. 3, step 402). Moreover, the control unit 55 assigns each active mode terminal to the sub bands of the narrow band NFR and expansion band, and inputs the assignment information to the sub frame generation unit 59 (step 403). The sub frame generation unit 59 generates and transmits second sub frames SF2 (see FIG. 3) so that individual pilots and individual data for each terminal can be transmitted using the sub bands specified in the assignment information (step 404).

By transmitting an individual pilot, it becomes possible for a terminal that receives individual data and individual control signals to perform synchronized demodulation and SIR measurement using the individual pilot without use of a common pilot.

(e) Sub Band Assignment Control for a High-Speed Moving Terminal

Figure 10:
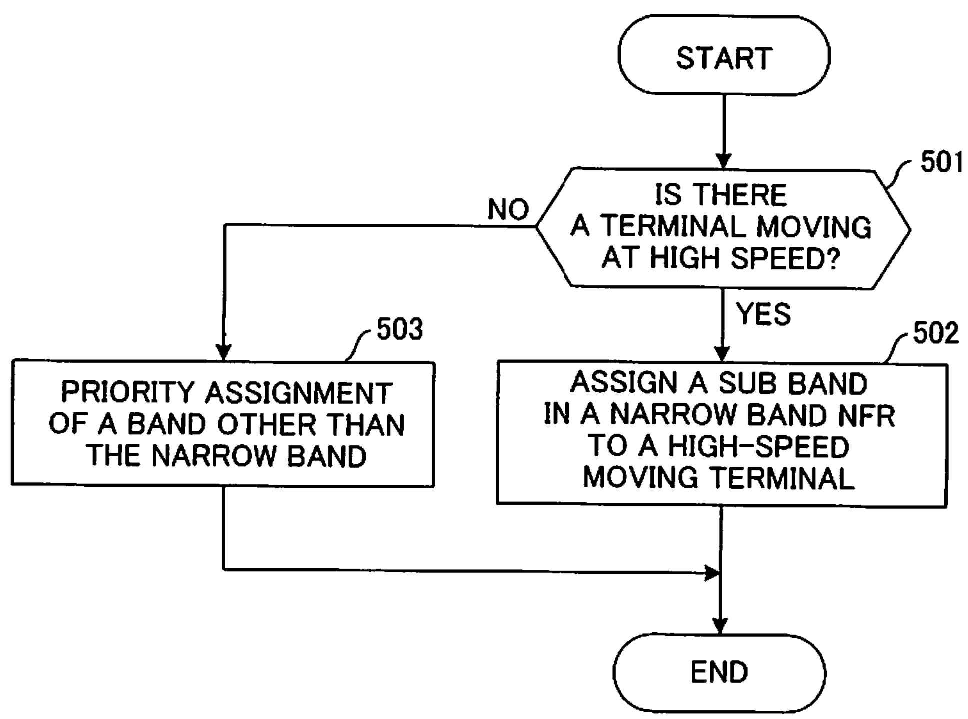
FIG. 10 is a flowchart of the sub band assignment control process for a high-speed mobile terminal.

FIG. 10 is a flowchart of the control process for assigning sub bands to a high-speed moving terminal.

The control unit 55 makes reference to a control signal that is transmitted from a terminal that is the destination for transmitting individual data, and determines whether that terminal is a high-speed moving terminal (step 501). When the terminal is moving at high speed, the control unit 55 assigns sub bands that belong to the narrow band NFR to the terminal even during transmission of a first sub frame SF1 (step 502). On the other hand, when the terminal is not moving at high speed, the control unit 55 assigns a sub band that does not belong to the narrow band NFR to the terminal during transmission of a first sub frame SF1 (step 503). In the process described above, the terminal determines whether or not it is moving at high speed and notifies the base station with a control signal, however, it is also possible for the base station to make the determination based on a measurement of a pilot signal transmitted from the terminal.

By performing the process described above, it is possible for a terminal moving at high speed to obtain a highly accurate pilot by averaging the common pilots of the previous and following sub frames, and to improve the reception quality.

(f) Considering Common Pilots from Adjacent Base Stations

The control unit 55 receives information (whole band and narrow band common pilot transmission timing, bandwidth information) from adjacent base stations or from the network about the common pilot transmission method used by adjacent base stations, and based on the received information, is able to evaluate the SIR measurement results. This is, for example, because the reliability of the SIR measurement results changes depending on whether or not the SIR measurement timing coincides with the common pilot transmission timing by an adjacent base station.

(E) Construction of a Terminal

Figure 11:
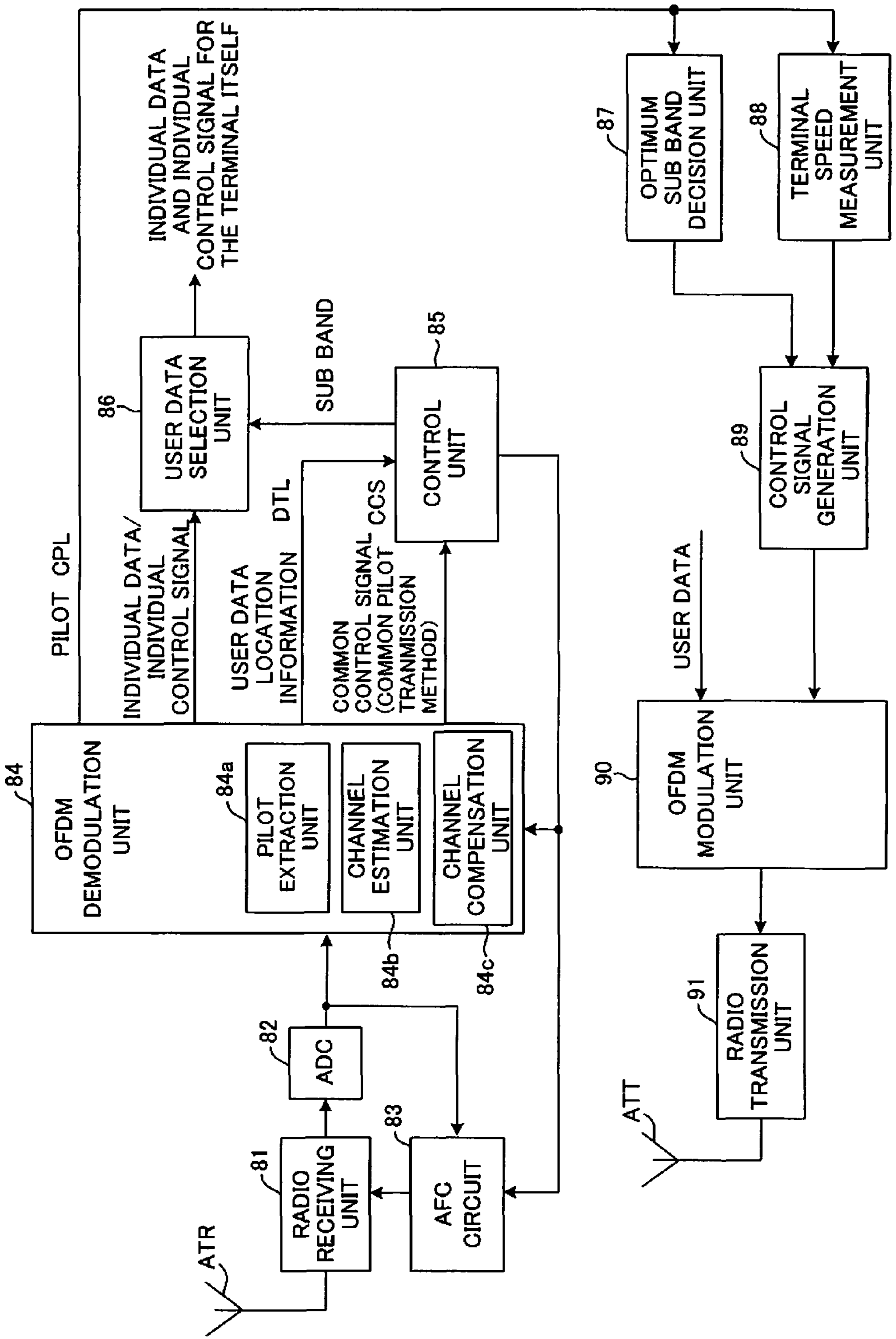
FIG. 11 is a schematic drawing of an example of a mobile terminal.

FIG. 11 shows the construction of the mobile terminal.

A radio receiving unit 81 performs DOWN conversion of the frequency of a radio signal that is received by an antenna ATR to a baseband frequency, an AD conversion unit 82 performs AD conversion of the baseband signal and inputs the result to an OFDM demodulation unit 84. An AFC circuit 83 performs AFC control in the same way as the AFC circuit 11 shown in FIG. 16, and performs control so that the frequency offset is zero.

Figure 16:
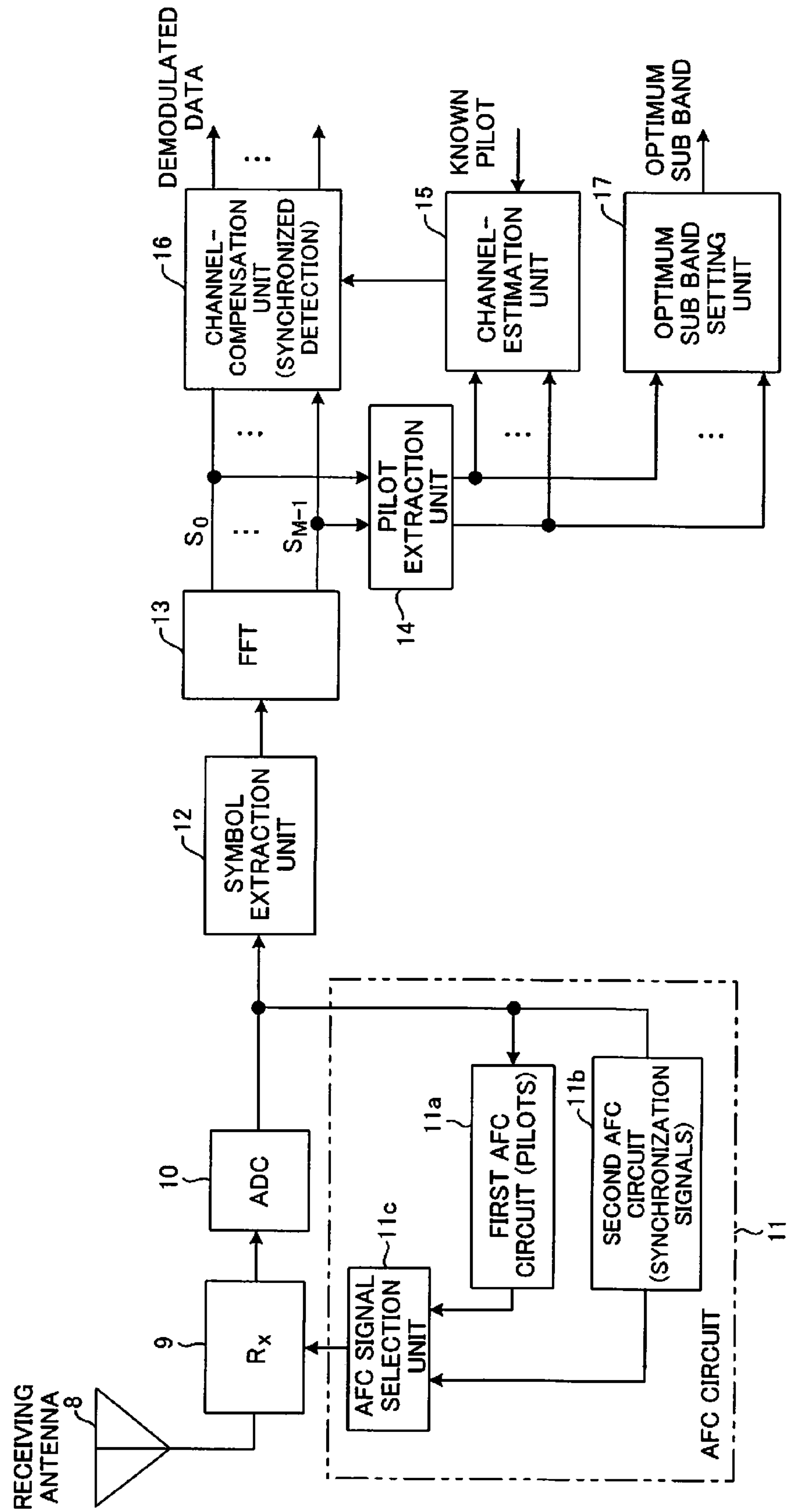
FIG. 16 is a schematic drawing of an OFDM receiving device.
Figure 17:
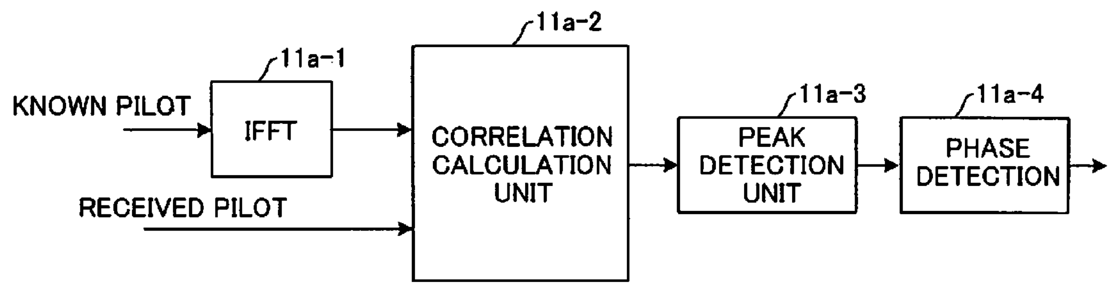
FIG. 17 is a drawing explaining an AFC circuit that uses pilot symbols.
Figure 18:
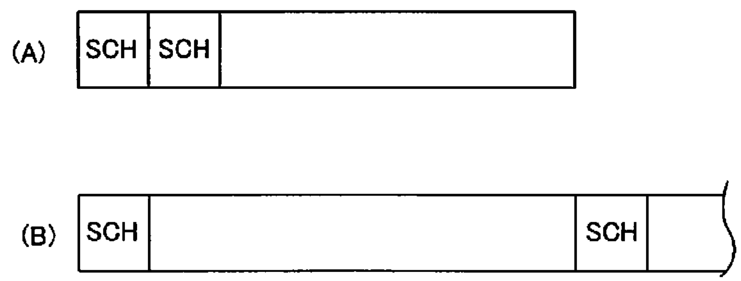
FIG. 18 is a drawing explaining a synchronization signal.
Figure 19:
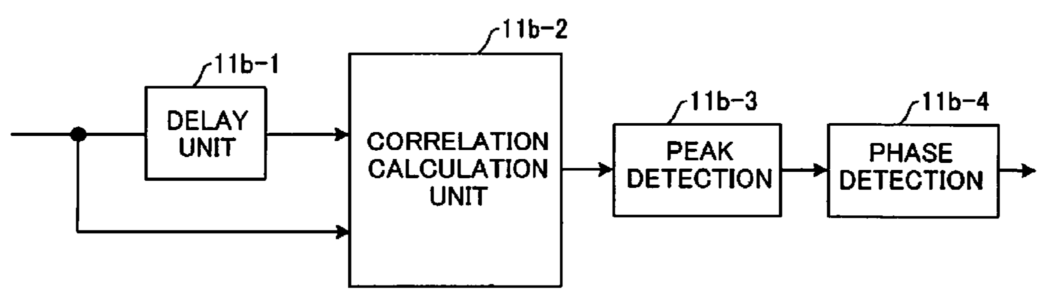
FIG. 19 is a drawing explaining an AFC circuit that uses a synchronization signal.

As shown in FIG. 16, the OFDM demodulation unit 84 comprises a symbol removal unit, FFT unit, pilot extraction unit, channel estimation unit, and channel compensation unit (synchronized-demodulation unit), and demodulates and outputs the common control signals CCS, individual data/individual control signals, user data location information DTL, and common pilots CPL that are transmitted from a base station.

A control unit 85 extracts common pilot transmission method information that is included in the common control signal CCS, and from that information identifies the reception timing of the common pilots of the whole band, and the reception timing of the common pilots of the narrow band and the bandwidths thereof, then notifies them to the AFC circuit 83 and OFDM demodulation unit 84. A pilot extraction unit 84*a* of the OFDM demodulation unit 84 extracts and outputs common pilots based on the timing and band information that is notified from the control unit 55. Moreover, a channel estimation unit 84*b* of the OFDM demodulation unit performs channel estimation based on the common pilots, and a channel compensation unit 84*c* performs channel compensation.

The control unit 85 identifies the sub bands in which individual data/individual control signals destined for that terminal are transmitted based on the user data location information DTL and inputs the identified sub band information to a user data selection unit 86. The user data selection unit 86 selects individual data and individual control signals destined for that terminal from the sub bands specified by the control unit 55.

Furthermore, when an identified sub band does not belong to the narrow band NFR, the control unit 85 notifies the OFDM demodulation unit 84 of the sub band. The pilot extraction unit 84*a* of the OFDM demodulation unit 84 extracts an individual pilot from the notified sub band, the channel estimation unit 84*b* performs channel estimation based on that individual pilot, and the channel-compensation unit 84*c* performs channel compensation.

An optimum sub band decision unit 87 uses a common pilot to decide a sub band having the best reception quality, and a terminal speed measurement unit 88 uses a common pilot to measure the speed of the terminal movement by a well-known method. A control signal generation unit 89 generates a control signal that includes the sub band information and terminal movement speed, then an OFDM modulation unit 90 performs OFDM modulation of the input control signal and user data for which time-division multiplexing was performed, and a radio transmission unit 91 transmits the OFDM signal from a transmission antenna ATT.

In the explanation of FIG. 11 above, the case was explained in which OFDM modulation was performed and the signal was transmitted, however, it is not absolutely necessary to perform OFDM modulation.

Figure 12:
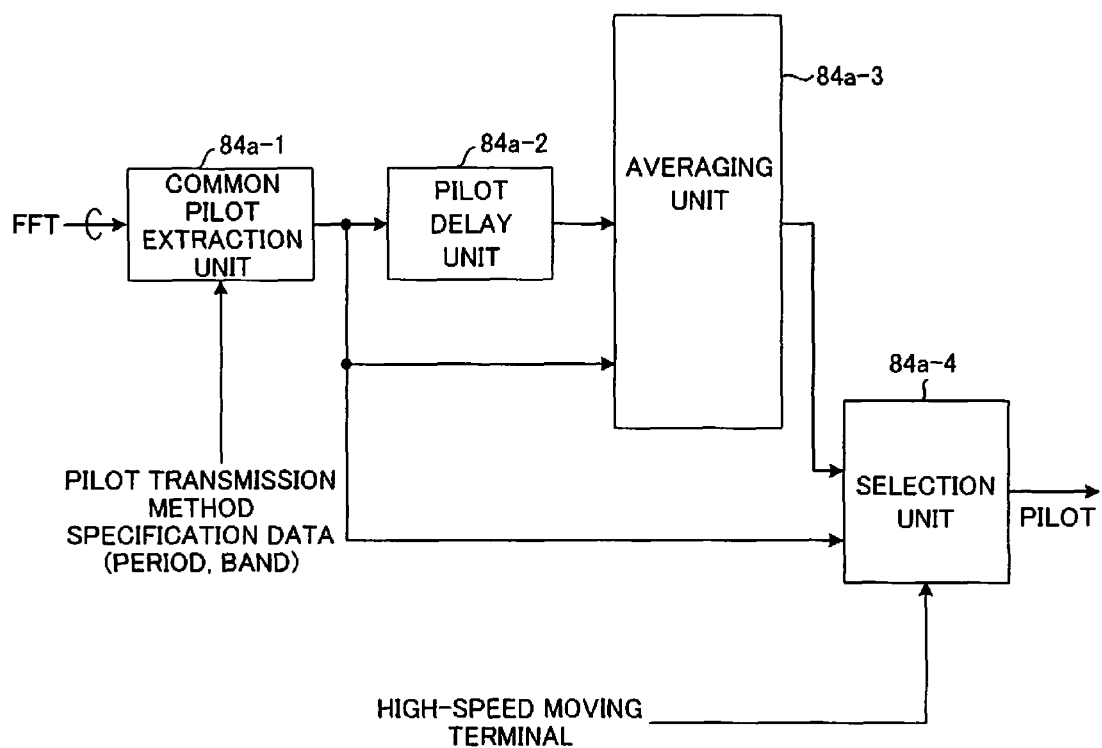
FIG. 12 is a schematic drawing of an example of a pilot extraction unit.
Figure 13:
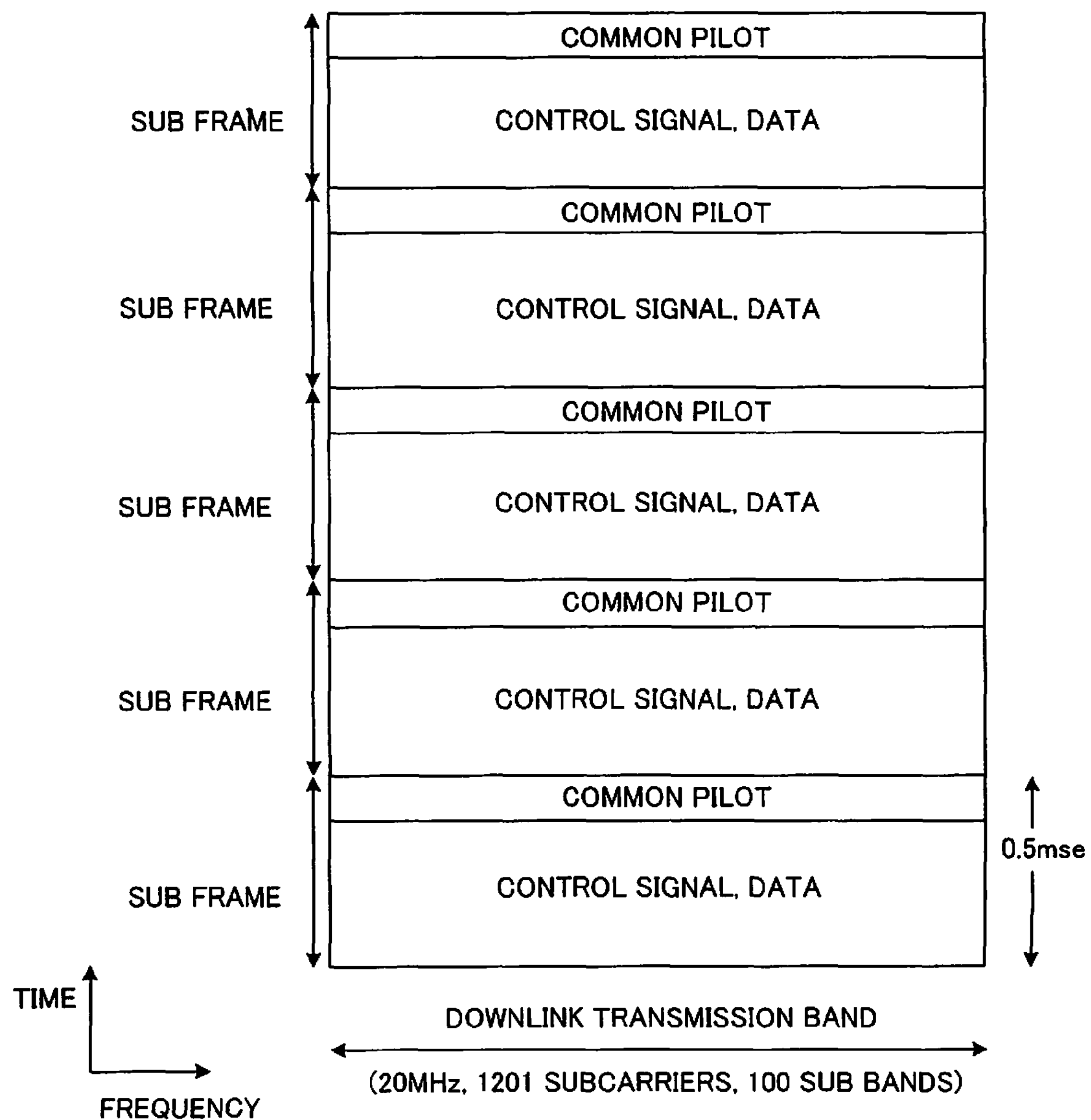
FIG. 13 is a drawing explaining a sub frame sequence in a downlink from a EUTRAN radio access unit.
Figure 14:
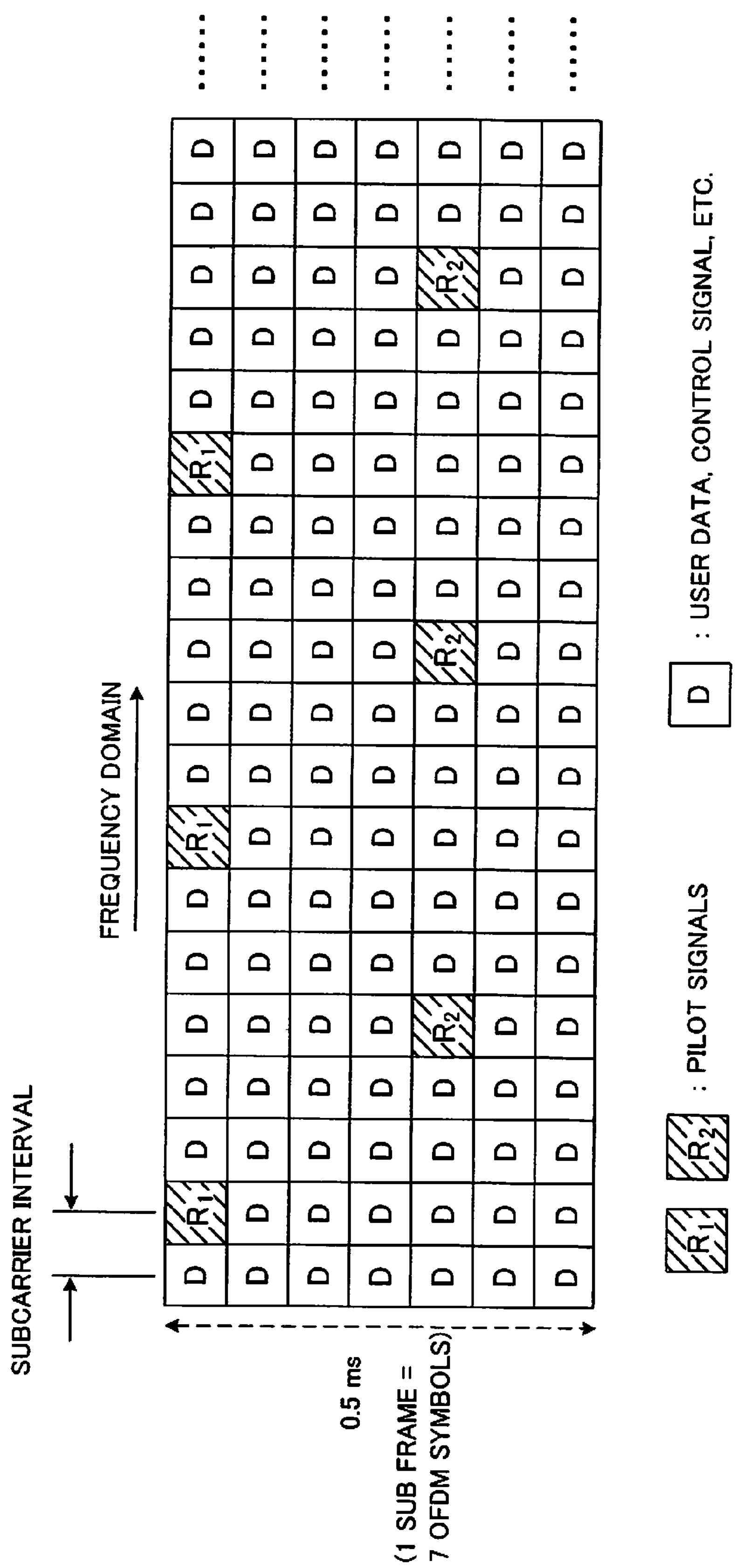
FIG. 14 is an example of a sub frame.
Figure 15:
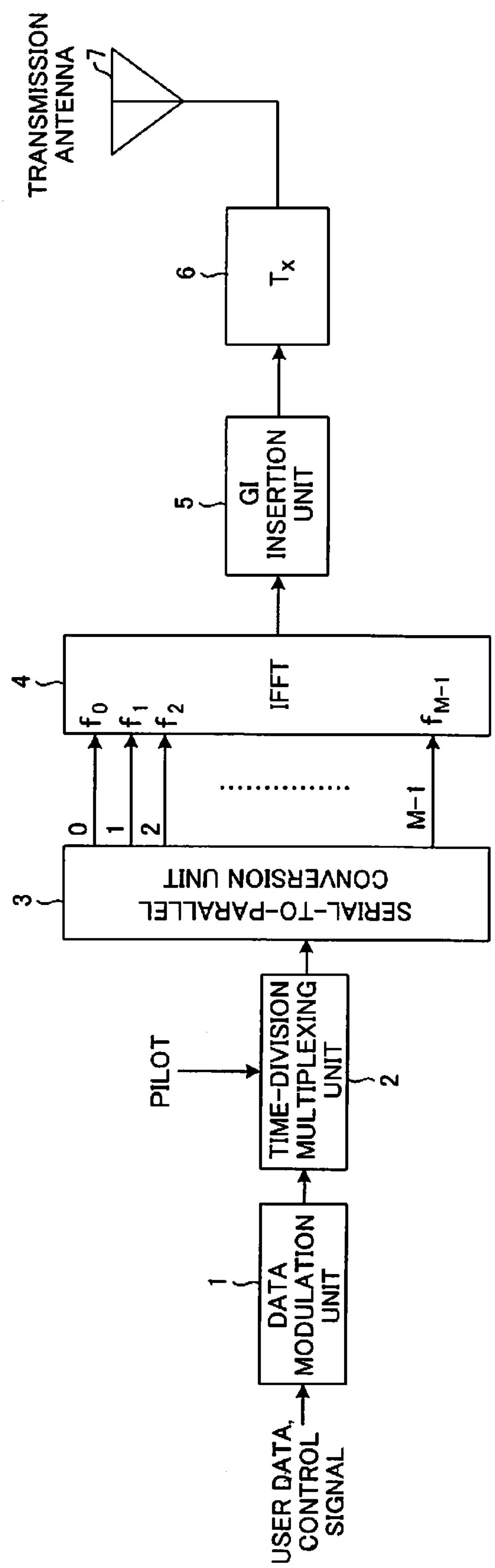
FIG. 15 is a schematic drawing of an example of a transmission device in an OFDM communication system.

FIG. 12 is a drawing showing an example of the construction of the pilot extraction unit 84*a*, and is such that it averages the pilot signals of the previous and following sub frames and outputs the result. A common pilot extraction section 84*a*-1 extracts and outputs common pilots based on the notification of the timing and band information from the control unit 85, and a pilot delay unit 84*a*-2 delays the pilot signals one sub frame period and outputs the pilot signals. An averaging unit 84*a*-3 calculates the average of common pilots that were extracted from the previous and following sub frames, and in the case of a terminal moving at high-speed, a pilot selection unit 84*a*-4 selects the pilot output from the averaging unit, and when the terminal is not moving at high speed, selects the common pilot that is output from the common pilot extraction unit 84*a*-1. With this construction, it is possible to perform channel compensation control and SIR measurement using a pilot having high accuracy even when a terminal is moving at high speed, and thus it is possible to improve the reception quality.

When transmitting an individual pilot in addition to individual data and individual control signals to a terminal moving at high speed, the averaging unit 84*a*-3 uses not only the common pilots, but also the individual pilot when taking the average, and by doing so, it becomes possible to extract a pilot having even higher accuracy.

Effect of the Invention

With the present invention described above, common pilots do not need to be transmitted over the whole band constantly in conditions of low data traffic, so it is possible to reduce the power consumption required for pilot transmission. Moreover, a base station always transmits common pilots over at least a specified narrow band, so it is possible to receive the pilots and perform frequency offset control even in the case of a terminal that is performing intermittent data transmission with the base station.

With the present invention, in conditions of high data traffic such as during the daytime, common pilots can be transmitted over the whole band, and at night when the data traffic becomes low, the common pilots can be transmitted over a narrow band, so it is possible to reduce the power consumption required for pilot transmission.

With the present invention, the bandwidth of the narrow band is controlled based on the number of terminals (active mode terminals) that are always in a state of being capable of data transmission with the base station, so it is possible for all terminals desiring communication to perform communication.

With the present invention, when a terminal is moving at high speed, by averaging channel estimation values that are found based on received values of common pilots from the previous and following sub frames, processing using highly accurate pilots becomes possible.

With the present invention, when transmitting individual data using a sub band that does not belong to the narrow band, an individual pilot is transmitted by that sub band, so pilot processing is possible using an individual pilot without using a common pilot.

What is claimed is:

1. A pilot transmission method in a downlink radio transmission zone, comprising:

dividing sub frames into first sub frames that include plural transmission timings and transmit common pilots over a whole transmission band as well as user data and control data at the transmission timings, and second sub frames that include plural transmission timings and transmit common pilots over a specified narrow band of a whole transmission band as well as user data and control data at the transmission timings; and transmitting common pilots by transmitting said first and second sub frames in a downlink radio transmission zone.

2. The pilot transmission method of claim 1, comprising:

transmitting said first sub frames at a certain period, and transmitting said second sub frames at time section when said first sub frames are not transmitted.

3. The pilot transmission method of claim 1, comprising:

monitoring the sum of a number of terminals that are always in a state capable of data transmission/data reception with a base station, and a number of terminals that are in a state capable of intermittent data transmission/data reception with a base station; and shortening the period of said first sub frames based on said sum, or keeping said period fixed and controlling a number of continuous first sub frames based on said sum.

4. The pilot transmission method of claim 3, comprising: making the intermittent transmission period of terminals that are capable of intermittent data transmission/data reception with a base station the same as the transmission period of said first sub frames.

5. The pilot transmission method of claim 1, comprising: monitoring a number of terminals that are always in a state capable of data transmission/data reception with a base station, and controlling the bandwidth of said narrow band based on that number of terminals.

6. The pilot transmission method of claim 1, comprising: dividing a whole band into a plurality of sub bands; and when data is transmitted to a specified terminal using one or more sub bands, and if the specified terminal is a terminal moving at high speed, assigning sub bands belonging to said narrow band for the high-speed moving specified terminal at the time of the transmission of said first and second sub frames.

7. The pilot transmission method of claim 1, comprising: in a case where data is transmitted using a sub band that does not belong to said narrow band at the time of the transmission of said second sub frames transmitting an individual pilot using that sub band.

8. A radio base station apparatus that transmits sub frames that include pilots in a downlink radio transmission zone, a-n-el comprising:

a sub-frame generation unit that generates first sub frames that include plural transmission timings and transmit common pilots over a whole transmission band as well as user data and control data at the transmission timings, and generates second sub frames that include plural transmission timings and transmit common pilots over a specified narrow band as well as user data and control data at the transmission timings; and a radio transmission unit that transmits said first and second sub frames using radio transmission.

9. The radio base station apparatus of claim 8 wherein said sub-frame generation unit comprises:

a first common pilot generation unit that generates common pilots for said whole transmission band;

a second common pilot generation unit that generates common pilots for said narrow band;

a creation unit that creates individual data and control data addressed to each terminal; and sub-frame creation unit configured to create said first sub frames for a whole band that includes the common pilots generated by said first common pilot generation unit, said individual data and control data so that the first sub frames are transmitted at a certain period, and configured to create said second sub frames for a narrow band that includes the common pilots generated by said second common pilot generation unit, said individual data and control data so that the second sub frames are transmitted at the time section when said first sub frame is not transmitted.

10. The radio base station apparatus of claim 9 further comprising:

a management unit that manages whether terminals are first terminals that are always in a state capable of data transmission/data reception with a base station, or second terminals that are in a state capable of intermittent data transmission/data reception with a base station; and a control unit that controls the period of said first sub frames based on a total number of said first terminals and said second terminals, or keeps said period fixed and controls a number of continuous first sub frames.

11. The radio base station apparatus of claim 9 further comprising:

a management unit that manages whether terminals are first terminals that are always in a state capable of data transmission/data reception with a base station, or second terminals that are in a state capable of intermittent data transmission/data reception with a base station; and a control unit that controls the bandwidth of said narrow band based on a number of said first terminals.

12. The radio base station apparatus of claim 10, wherein when a whole band is divided into a plurality of sub bands, and data is transmitted to a specified terminal using one or more sub band, said control unit, if the specified terminal is a high-speed moving terminal, performs control so as to assign sub bands belonging to said narrow band to the high-speed moving specified terminal at the time of the transmission of said first and second sub frames.

13. The radio base station apparatus of claim 10, further comprising an individual pilot creation unit that creates individual pilots, wherein in a case where data is transmitted using a sub band that does not belong to said narrow band at the time of the transmission of said second sub frame, said control unit performs control so as to transmit said individual pilot using that sub band.

14. A terminal apparatus that receives sub frames that include pilots in downlink radio transmission zones, comprising:

a transmission method identification unit that receives information about a transmission method of common pilots from a base station and identifies, based upon the information, both the transmission method for transmitting common pilots in a first sub frame that is transmitted over a whole transmission band, and the transmission method for transmitting common pilots in a second sub frame that is transmitted over a specified narrow band, wherein the first sub frame includes plural transmission timings and transmits common pilots over the whole transmission band as well as user data and control data at the transmission timings, and the second sub frame includes plural transmission timings and transmits common pilots over the specified narrow band as well as user data and control data at the transmission timings;

a pilot extraction unit that extracts common pilots based on the common pilot transmission method; and a processing unit that performs specified pilot processing using the common pilots.

15. The terminal apparatus of claim 14 wherein in a case where said first sub frame is transmitted at a specified period and said second sub frame is transmitted at time section when said first sub frame is not transmitted, said information includes a transmission period information of said first sub frame, and information specifying said narrow band over which common pilots of said second sub frame are transmitted.

* * * * *